US011948715B2

(12) United States Patent
Sugiyama et al.

(10) Patent No.: US 11,948,715 B2
(45) Date of Patent: Apr. 2, 2024

(54) MAGNETIC COMPOSITE

(71) Applicant: Murata Manufacturing Co., Ltd., Kyoto-fu (JP)

(72) Inventors: Mikito Sugiyama, Nagaokakyo (JP); Mitsuru Odahara, Nagaokakyo (JP); Takuya Ishida, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 286 days.

(21) Appl. No.: 17/408,063

(22) Filed: Aug. 20, 2021

(65) Prior Publication Data

US 2022/0059265 A1 Feb. 24, 2022

(30) Foreign Application Priority Data

Aug. 21, 2020 (JP) ................................ 2020-139975

(51) Int. Cl.

*H01F 1/26* (2006.01)
*H01F 17/04* (2006.01)
*H01F 27/255* (2006.01)

(52) U.S. Cl.

CPC ............... *H01F 1/26* (2013.01); *H01F 17/04* (2013.01); *H01F 27/255* (2013.01); *Y10T 428/32* (2015.01)

(58) Field of Classification Search

None

See application file for complete search history.

(56) References Cited

U.S. PATENT DOCUMENTS

| | | | | |
|---|---|---|---|---|
| 2018/0108465 | A1* | 4/2018 | Takahashi | H01F 1/15333 |
| 2018/0204657 | A1* | 7/2018 | Shinkai | B22F 1/105 |
| 2019/0267169 | A1* | 8/2019 | Sawada | B22F 1/00 |
| 2020/0265976 | A1* | 8/2020 | Yamamoto | H01F 1/14775 |
| 2022/0005636 | A1* | 1/2022 | Kawauchi | B22F 1/07 |
| 2022/0072606 | A1* | 3/2022 | Suetsuna | C22C 38/10 |
| 2022/0181930 | A1* | 6/2022 | Tsuchiya | H02K 15/03 |

FOREIGN PATENT DOCUMENTS

| | | | | | |
|---|---|---|---|---|---|
| JP | S62-142750 | A | | 6/1987 | |
| JP | 2006-147959 | A | | 6/2006 | |
| JP | 2008-124270 | A | | 5/2008 | |
| JP | 2008124270 | A | * | 5/2008 | |
| JP | 2014-103265 | A | | 6/2014 | |
| JP | 2014103265 | A | * | 6/2014 | H01F 1/15333 |
| JP | 2018-164104 | A | | 10/2018 | |

* cited by examiner

*Primary Examiner* — Kevin M Bernatz

(74) *Attorney, Agent, or Firm* — Studebaker & Brackett PC

(57) ABSTRACT

A magnetic composite contains metal magnetic particles and a resin. The metal magnetic particles contain at least one Fe-containing crystalline material, and [Formula 1]Bs×α×{log(γ×1/D+δ×Bs+ε)}^β≥13T, where Bs and D are the saturation flux density in T and the median diameter of crystallites in μm, respectively, of the crystalline material, α=14.3, β=−0.67, γ=752, δ=512, and ε=−815.

16 Claims, 9 Drawing Sheets

MATERIAL SAMPLE 5 (Hc=507 A/m)

MATERIAL SAMPLE 3 (Hc=83 A/m)

MAGNETIC COMPOSITE

CROSS-REFERENCE TO RELATED APPLICATION

This application claims benefit of priority to Japanese Patent Application No. 2020-139975, filed Aug. 21, 2020, the entire content of which is incorporated herein by reference.

BACKGROUND

Technical Field

The present disclosure relates to a magnetic composite.

Background Art

Inductors can be used in power supply circuits. Magnetic materials for inductors need to have properties such as high magnetic permeability and good bias characteristics. In large-current applications in particular, satisfactory direct-current (DC) bias characteristics are required. A known approach to improve DC bias characteristics is to use a material having a high saturation flux density. As a material having a high saturation flux density, Japanese Unexamined Patent Application Publication No. 62-142750 presents a material composed of FeCo and Co.

SUMMARY

As stated, the use of a material having a high saturation flux density can be effective in applications in which saturation in the magnetic substance proceeds in a magnetic field excited by a large electric current. If such a material is used in a small radiofrequency (RF) power supply circuit, however, the magnetic field excited is weaker than in large-current applications because of the relatively small current density. To control the increase in eddy current loss that occurs during RF operation, furthermore, it is required to reduce the diameter of the particles of the high-saturation-flux-density material and form an insulating coating between the particles. The distance between the particles is therefore large, and this results in an increase in magnetic resistance. The magnetic permeability of the material is low in consequence.

The magnetic flux through each particle is therefore small for the saturation flux density of the particles. As a result, when it comes to small RF power supply circuits for example, it is not necessarily effective to use a magnetic material having a high saturation flux density.

Accordingly, the present disclosure provides a magnetic material that can achieve improved DC bias characteristics.

According to preferred embodiments of the present disclosure, a magnetic composite contains metal magnetic particles and a resin. The metal magnetic particles contain at least one Fe-containing crystalline material, and $$Bs \times \alpha \times \{\log(\gamma \times 1/D + \delta \times Bs + \varepsilon)\}^{\wedge}\beta \geq 13, \quad \text{[Formula 1]}$$

where Bs and D are a saturation flux density in T and a median diameter of crystallites in μm, respectively, of the crystalline material, α=14.3, β=−0.67, γ=752, δ=512, and ε=−815.

According to other preferred embodiments of the present disclosure, a magnetic composite contains metal magnetic particles and a resin. The metal magnetic particles contain at least one Fe-containing crystalline material, and $$(A \times \text{Fe content in wt } \% + B) \times \alpha \times [\log\{\gamma \times 1/D + \delta \times (A \times \text{Fe content in wt } \% + B) + \varepsilon\}]^{\wedge}\beta \geq 13, \quad \text{[Formula 2]}$$

where D is a median diameter of crystallites in μm of the crystalline material, α=14.3, β=−0.67γ=752, δ=512, ε=−815, A=0.0637, and B=−4.21.

According to preferred embodiments of the present disclosure, magnetic materials that can achieve improved DC bias characteristics can be provided.

Other features, elements, characteristics and advantages of the present disclosure will become more apparent from the following detailed description of preferred embodiments of the present disclosure with reference to the attached drawings.

DETAILED DESCRIPTION

The following describes an embodiment of the present disclosure in detail with reference to the drawings. It is to be noted that the following embodiment is for illustration purposes and is not intended to limit the present disclosure.

Magnetic Composite

A magnetic composite according to an embodiment of the present disclosure contains, as its essential component, at least metal magnetic particles that have a relatively large diameter (median diameter (D50)). Such metal magnetic particles are hereinafter referred to as first metal magnetic particles. Besides the first metal magnetic particles, the magnetic composite according to an embodiment of the present disclosure can further contain second metal magnetic particles that have a diameter (median diameter (D50)) smaller than that of the first metal magnetic particles. In an embodiment, the first metal magnetic particles can have a diameter (median diameter (D50)) of about 10 μm or more and about 40 μm or less (i.e., from about 10 μm to about 40 μm), and the second metal magnetic particles can have a diameter (median diameter (D50)) of about 0.5 μm or more and about 6 μm or less (i.e., from about 0.5 μm to about 6 μm). As mentioned herein, a "median diameter D50" refers to a median diameter by volume. The second metal magnetic particles may contain a crystalline material. The crystalline material in the second metal magnetic particles may contain Fe.

The inventors carried out extensive research to find a solution by which the DC bias characteristics of a magnetic material can be improved, and finally came up with the present disclosure.

A particular focus was on relationships between the following three factors. The inventors considered these factors potential keys to the improvement of DC bias characteristics and investigated them, and the findings from the studies led the inventors to the present disclosure.

(1) The median diameter of crystallites (D [μm]) of first, crystalline metal magnetic particles in the magnetic material, which is in a certain relationship with coercivity (Hc [A/m]);

(2) Saturation flux density (Bs [T]); and (3) Rated DC magnetic field (Hsat [kA/m]), which correlates with DC bias characteristics.

Figure 1:
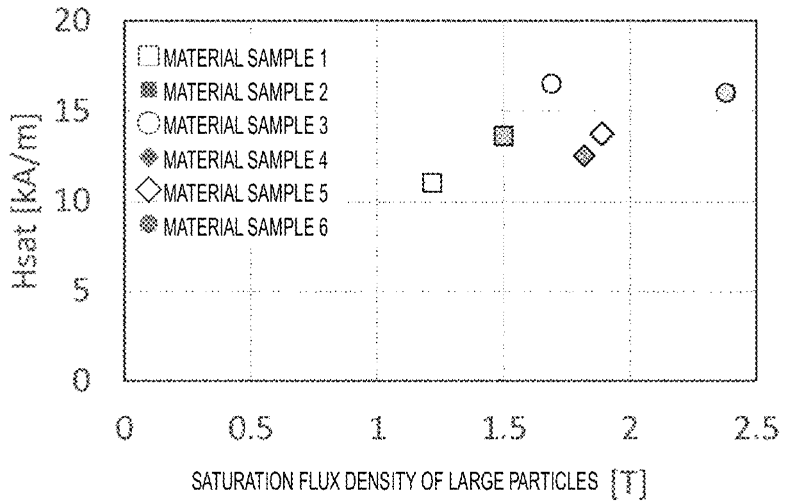
FIG. 1 is a graph of the Bs (saturation flux density) versus Hsat of first metal magnetic particles.

Specifically, the inventors acknowledge the following. As shown in Table 1 and FIG. 1, if material samples 1 to 6 below are used as first metal magnetic particles that contain an Fe-containing crystalline material, rated DC magnetic field (Hsat [kA/m]) tends to increase with increasing saturation flux density (Bs [T]) up to near a particular saturation flux density (1.69 T), but beyond the particular saturation flux density, rated DC magnetic field (Hsat [kA/m]) tends to decrease. The inventors also acknowledge that with material samples 1 to 6, as shown in Table 1 and FIG. 2, coercivity (Hc [A/m]) tends to be substantially stable even with increasing saturation flux density (Bs [T]) up to near a particular saturation flux density (1.69 T), but beyond the particular saturation flux density, coercivity (Hc [A/m]) tends to increase rapidly.

| Material sample | Composition | Bs [T] | Hc [A/m] | Hsat [kA/m] |
|---|---|---|---|---|
| 1 | Fe-based amorphous alloy (89 wt % Fe) | 1.23 | 87.7 | 11 |
| 2 | Fe-based amorphous alloy (93 wt % Fe) | 1.49 | 104 | 13.6 |
| 3 | Fe- and Si-containing crystalline alloy (6.5 wt % Si) | 1.69 | 83.3 | 16.5 |
| 4 | Fe- and Si-containing crystalline alloy (4.5 wt % Si) | 1.84 | 388 | 12.5 |
| 5 | Fe- and Si-containing crystalline alloy (3 wt % Si) | 1.89 | 507 | 13.7 |
| 6 | Fe-, Co-, and V-containing crystalline alloy (49 wt % Co and 2 wt % V) | 2.38 | 2360 | 16 |

Based on these, the inventors found that improving bias characteristics requires making metal magnetic particles (corresponding to the aforementioned first metal magnetic particles) from an Fe-containing crystalline material (metal magnetic material), which has a large "flux density (Bs [T])" and a small "coercivity (Hc [A/m])." In addition to this, the inventors also found that to reduce the coercivity, it is good to lower the energy barrier to domain wall displacement by using metal magnetic particles having a relatively large "median diameter of crystallites (D [μm])" (corresponding to the aforementioned first metal magnetic particles).

In an embodiment, a "relatively large 'median diameter of crystallites (D [μm])' of the first metal magnetic particles" refers to a median diameter of about 5 μm or more. More preferably, the median diameter of crystallites of the first metal magnetic particles is about 10 μm or more, even more preferably about 15 μm or more. In order for the increase in coercivity to be controlled well, it is preferred that the median diameter of crystallites of the first metal magnetic particles be larger than that of the second metal magnetic particles. The relative magnitudes of the median diameters of crystallites of the first and second metal magnetic particles are not critical, but for example, the ratio of the median diameter of crystallites of the first metal magnetic particles to that of the second metal magnetic particles (i.e., the median diameter of crystallites of the first metal magnetic particles/the median diameter of crystallites of the second metal magnetic particles) can be about 1.1 or more and about 5.0 or less (i.e., from about 1.1 to about 5.0), about 2.0 or more and about 4.0 or less (i.e., from about 2.0 to about 4.0), or about 2.5 or more and about 3.5 or less (i.e., from about 2.5 to about 3.5).

Considering these, the inventors attempted to formulate the relationships between the three factors that make first metal magnetic particles as a component of a magnetic material satisfy the foregoing. The relationships were formulated as in formulae 1 and 2, which will be given later.

Before the formulation into formulae 1 and 2, the following presents the relationship between rated DC magnetic field (Hsat [kA/m]), saturation flux density (Bs [T]), and coercivity (Hc [A/m]) based on the information given in Table 1. Specifically, the relationship between rated DC magnetic field (Hsat [kA/m]) divided by saturation flux density (Bs [T]) (vertical axis) and log(Hc) (horizontal axis) is presented (see FIG. 3). This relationship is formulated as in formula 3. As can be seen from FIG. 3 and formula 3, there is a certain correlation between log(Hc) (horizontal axis) and rated DC magnetic field (Hsat [kA/m]) divided by saturation flux density (Bs [T]) (vertical axis) ($y=14.3x^{-0.67}$).

[Formula 3]

$$\mathrm{Hsat}/Bs=\alpha\times\{\log(Hc)\}\hat{}\beta$$

$$\alpha=14.3$$

$$\beta=-0.67$$

Figure 2:
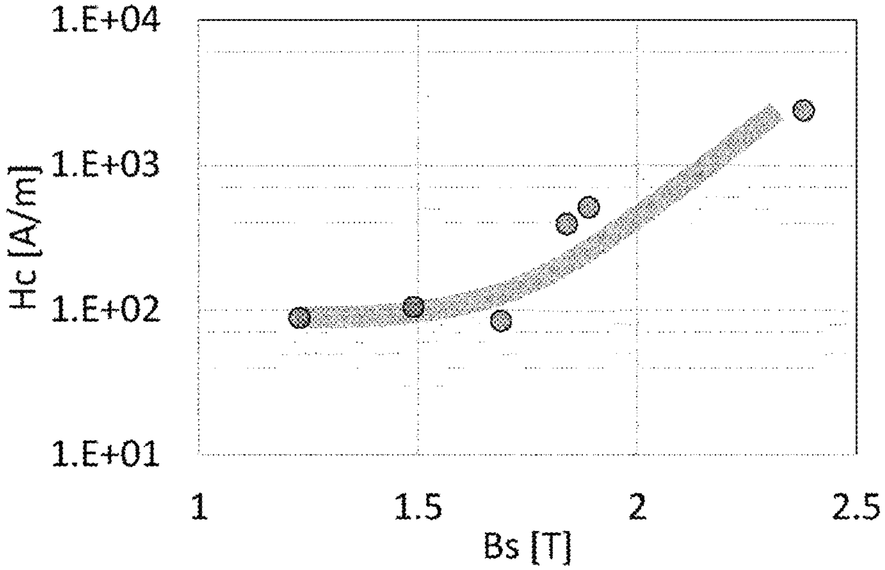
FIG. 2 is a graph of the Bs (saturation flux density) versus Hc (coercivity) of first metal magnetic particles.

As shown in Table 1 and FIG. 2, furthermore, coercivity (Hc[A/m]) tends to increase rapidly beyond a particular saturation flux density (1.69 T), with material sample 3 (Fe6.5Si (93.5 wt % Fe and 6.5 wt % Si) alloy) being the threshold. Meanwhile, the relationship between median diameter of crystallites (D [μm]) and coercivity (Hc [A/m]) is presented on the premise that the metal magnetic material is Fe6.5Si (see FIGS. 5 and 6). This relationship is formulated as in formula 4, which will be given later.

It should be noted that this check for the relationship between median diameter of crystallites (D [μm]) and coercivity (Hc [A/m]) assumes that five alloy powders produced from the magnetic material Fe6.5Si by atomization processes varying in cooling rate and heating conditions are classified using 53-μm and 20-μm mesh sieves; powder that passes through the former but does not pass through the latter is used. The coercivity of the five types of particles after classification is presented in Table 2.

After the classification, the median diameter (D50) and saturation flux density Bs of each of the five types of particles were 43 μm and 1.75 T, respectively.

TABLE 2

| Particles | Hc [A/m] |
|---|---|
| 1 | 366 |
| 2 | 263 |
| 3 | 235 |
| 4 | 210 |
| 5 | 159 |

Figure 4:
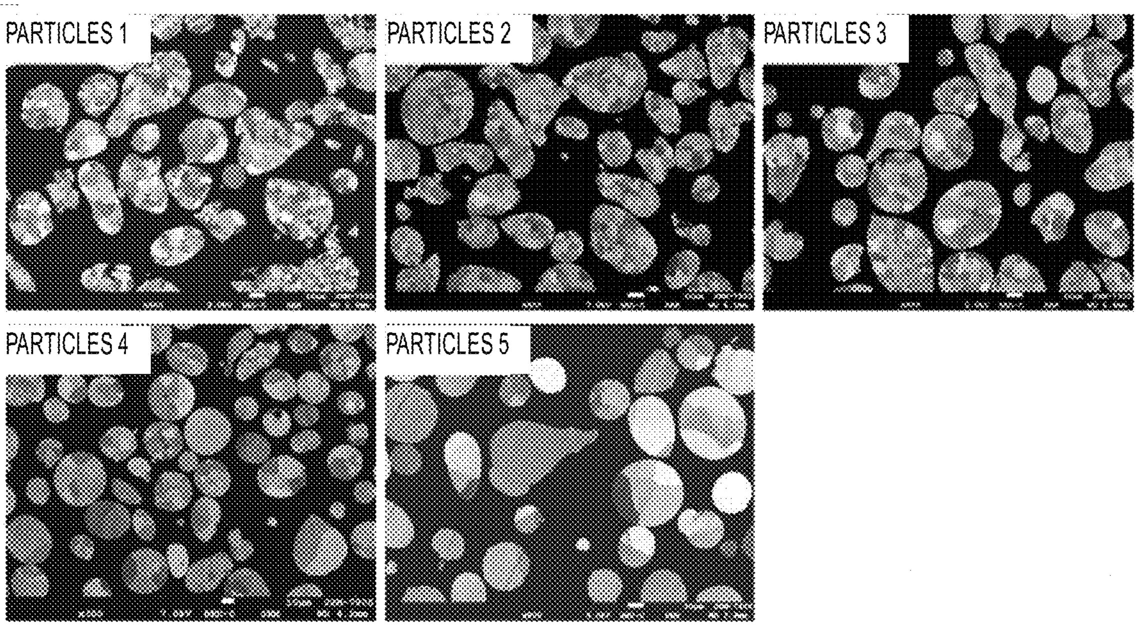
FIG. 4 presents cross-sectional SEM images of particles 1 to 5.

Here it is assumed that these sets of particles (also referred to as powders or material samples) are sealed with an epoxy resin, polished to expose a cross-section, have the exposed cross-section ground by ion milling, and then are subjected to the observation of the ground surface by FE-SEM in backscattered electron mode (acceleration voltage, 5 to 11 kev; current, 8 to 11 A). As can be seen from the cross-sectional SEM images of particles in FIG. 4, the magnetic particles are formed by smaller-diameter crystallites with increasing coercivity. The diameter of crystallites in the particles was calculated by image analysis using image analysis software and is based on the median in the distribution of equivalent circular diameters of crystallites observed inside thirty randomly selected particles.

Figure 5:
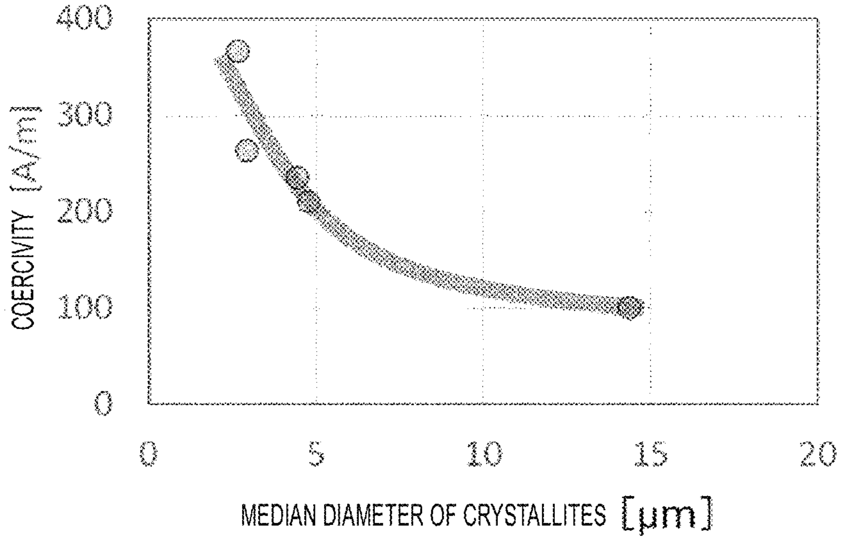
FIG. 5 is a graph of median diameter of crystallites versus Hc (coercivity)
Figure 6:
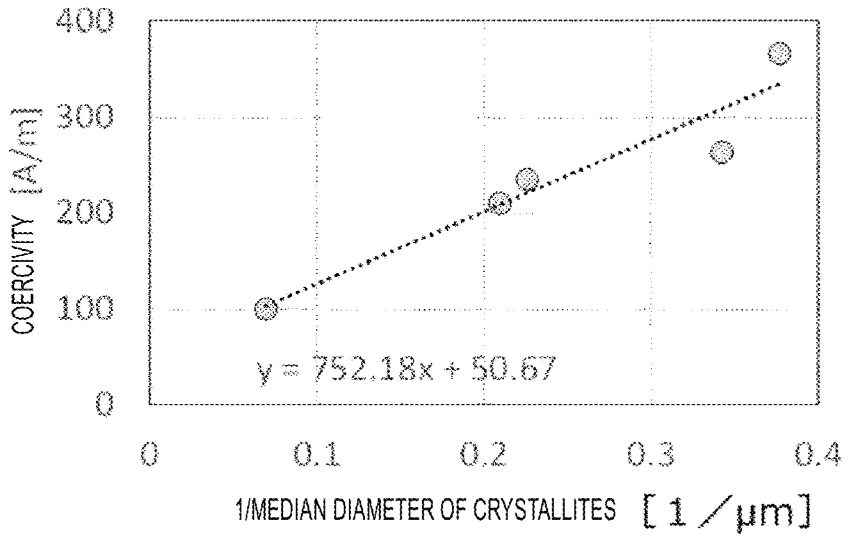
FIG. 6 is a graph of inverse median diameter of crystallites versus Hc (coercivity)

As can be seen from FIGS. 5 and 6 and formula 4, there is a certain correlation between inverse median diameter of crystallites (D [μm]) (horizontal axis) and coercivity (Hc [A/m]) (vertical axis) (y=752.18x+50.67). That is, it can be seen that as the diameter of crystallites increases, coercivity decreases accordingly.

$$Hc=\gamma\times 1/D+Hc0(\gamma=752, Hc0=50.7) \quad \text{[Formula 4]}$$

Figure 7:
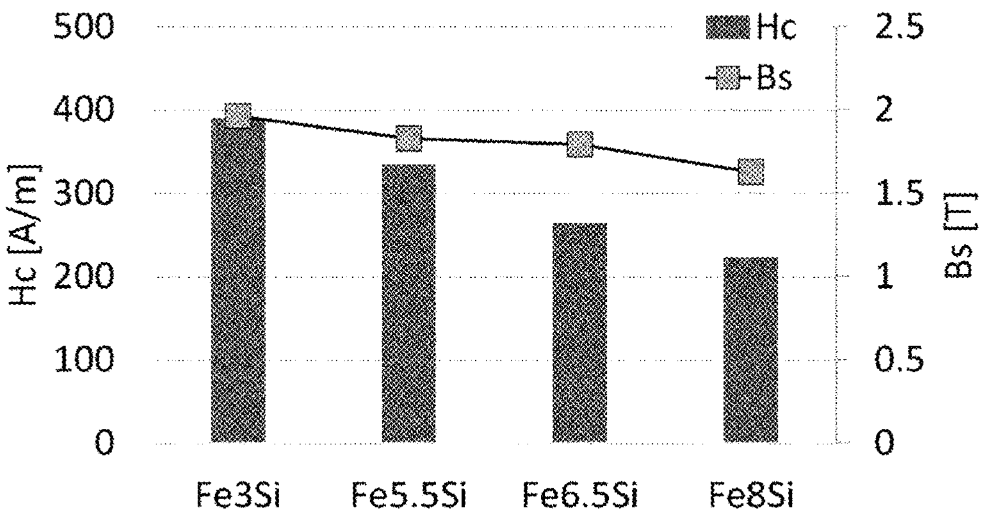
FIG. 7 is a graph of composition versus saturation flux density (Bs [T]) and coercivity (Hc [A/m])

In this formula, the intercept (Hc0 [A/m]) corresponds to the coercivity when the diameter of crystallites is infinity, or when there is no influence of grain boundaries. The inventors therefore presumed that coercivity (Hc0 [A/m]) correlates not with the diameter of crystallites but with another factor, saturation flux density. Assuming this presumption is true, the relationship between saturation flux density (Bs [T]) and coercivity (Hc [A/m]) is presented (see FIGS. 7 and 8). This relationship is formulated as in formula 5. In FIG. 7, it is assumed that the magnetic materials, on the horizontal axis, vary in Si content but are similar in the diameter of crystallites. As can be seen from FIGS. 7 and 8, coercivity is in a linear relationship with saturation flux density, with the slope coefficient being 512. By inserting what is provided by formula 5 into formula 4, coercivity can be formulated as in formula 6 as follows. Formulae 5 and 6 have an intercept E, and the inventors believe it is attributed to impurities, structural defects, etc., present in boundaries between or inside crystal grains.

$$Hc0=\delta\times Bs+\varepsilon \quad \text{[Formula 5]}$$

$$(\delta=512)$$

$$Hc=\gamma\times 1/D+\delta\times Bs+\varepsilon \quad \text{[Formula 6]}$$

$$(\gamma=752, \delta=512)$$

As stated in relation to FIG. 6 and formula 4, if it is assumed that Bs is 1.69 T, Hc0 is 50.7. When this is substituted into formula 5, ε is −815. By inserting what is provided by formula 6 into formula 3, rated DC magnetic field can be formulated as in formula 7.

$$Hsat=Bs\times\alpha\times\{\log(\gamma\times 1/D+\delta\times Bs+\varepsilon)\}^{\beta} \quad \text{[Formula 7]}$$

$$(\alpha=14.3, \beta=-0.67, \gamma=752, \delta=512, \varepsilon=-815)$$

Figure 9:
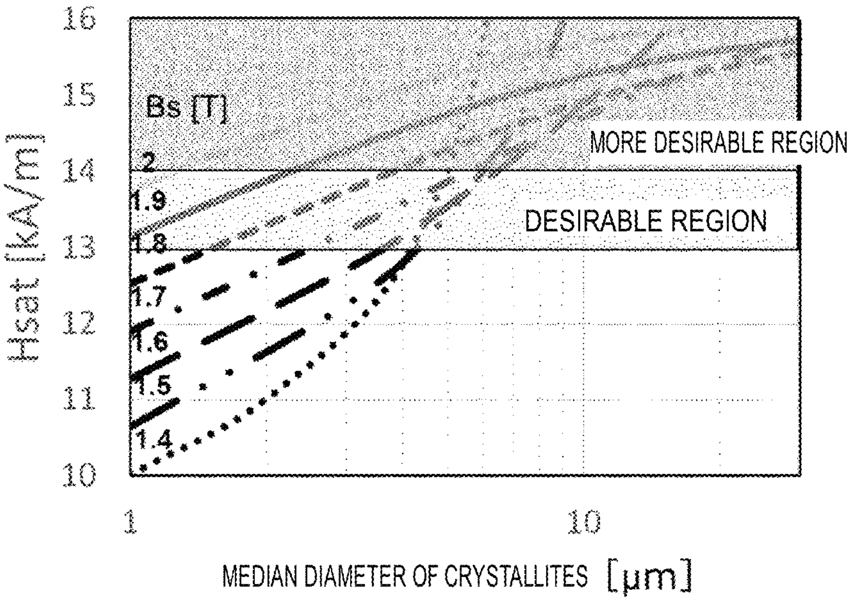
FIG. 9 is a graph of saturation flux density (Bs [T]) versus median diameter of crystallites versus Hsat.

From FIG. 9 (rated DC magnetic field (Hsat [kA/m]) versus median diameter of crystallites (D [μm]) at different saturation flux densities (Bs=1.4 to 2.0 [T])), furthermore, it can be seen that the improvement of rated DC magnetic field (Hsat [kA/m]) relies on how large Bs and the diameter of crystallites are. In the present disclosure, a particular focus is on what range these parameters should be in to achieve a rated DC magnetic field (Hsat [kA/m]) requirement for small inductors for RF applications, i.e., about 13 kA/m or more or preferably about 14 kA/m or more.

Based on these, the relationship between the median diameter of crystallites (D, μm) and saturation flux density (Bs, T) of a crystalline material can be formulated as in formula 1.

$$Bs\times\alpha\times\{\log(\gamma\times 1/D+\delta\times Bs+\varepsilon)\}\hat{}\beta\geq 13 \quad \text{[Formula 1]}$$

$$(\alpha=14.3, \beta=-0.67, \gamma=752, \delta=512, \varepsilon=-815)$$

The crystalline material(s) in the first metal magnetic particles that meet formula 1 can be Fe or at least one alloy selected from the group consisting of FeCo alloys, FeNi alloys, FeSi alloys, and FeSiCr alloys. In an embodiment of the present disclosure, it is particularly preferred that the crystalline material in the first metal magnetic particles that meet formula 1 be Fe.

As known, saturation flux density (Bs, T) is influenced strongly by the composition of the magnetic particles, the Fe content in particular. Considering this, the relationship between the Fe content (wt %) of magnetic particles and saturation flux density is explored based on the data in FIG. 7. As can be seen from FIG. 10, there is a certain correlation, specifically a linearity, between these two parameters. This relationship is formulated as in formula 8.

$$Bs=0.0637\times\text{Fe content (wt \%)}-4.21 \quad \text{[Formula 8]}$$

Based on these, by substituting formula 8 into what is provided by formula 1, the relationship between the median diameter of crystallites (D, μm) and the Fe content (wt %) of a crystalline material can be formulated as in formula 2.

$$(A\times\text{Fe content (wt \%)}+B)\times\alpha\times[\log\{\gamma\times 1/D+\delta\times(A\times\text{Fe content (wt \%)}+B)+\varepsilon\}]\hat{}\beta\geq 13 \quad \text{[Formula 2]}$$

$$(\alpha=14.3, \beta=-0.67, \gamma=752, \delta=512, \varepsilon=-815, A=0.0637, B=-4.21)$$

Overall, formulae 1 and 2 tell us the median diameter of crystallites (D, μm) and saturation flux density (Bs)/Fe content (wt %) of an Fe-containing crystalline material with which the desired rated DC magnetic field (Hsat [kA/m]) can be achieved. If the magnetic composite according to an embodiment of the present disclosure, which contains first metal magnetic particles containing Fe-containing crystalline material(s) as described above, is used in small RF power supply circuits, therefore, the desired rated DC magnetic field (Hsat [kA/m]) can be achieved satisfactorily. As a result, DC bias characteristics, which correlate with rated DC magnetic field (Hsat [kA/m]), can be improved.

That is, according to an embodiment of the present disclosure, a material can be given characteristics desirable for use in RF power inductors through the selection of an appropriate Fe content and an appropriate diameter of crystallites of first metal magnetic particles in accordance with formulae 1 and 2, which were established considering the influence of saturation flux density and coercivity on DC bias characteristics.

Reducing the diameter of second metal magnetic particles to improve packing density or thinning an insulating coating on the first metal magnetic particles to improve magnetic permeability can cause flux concentration into the first metal magnetic particles that can affect bias characteristics. According to an embodiment of the present disclosure, the impact on bias characteristics in such situations is mitigated by virtue of the foregoing. Increasing the diameter of crystallites of the first metal magnetic particles, into which magnetic flux concentrates easily, will reduce coercivity and therefore lessen the hysteresis effect. As a result, the separation between the minor and major magnetization curves becomes smaller, and magnetic permeability deteriorates more mildly when a DC bias magnetic field is applied.

As stated, in the magnetic composite according to an embodiment of the present disclosure, the first metal magnetic particles as its component contain at least one Fe-containing crystalline material. Preferably, the first metal magnetic particles further contain a Si component in order that low coercivity and high corrosion resistance will be attained more satisfactorily, with the proviso that the primary ingredient is the Fe component. The percentages of the Fe and Si components in the first metal magnetic particles are not critical, but it is good to set the percentage of the Fe component about 91 wt % or more and about 98 wt % or less (i.e., from about 91 wt % to about 98 wt %) and the percentage of the Si component about 2 wt % or more and about 9 wt % or less (i.e., from about 2 wt % to about 9 wt %) in order that high saturation flux density and low coercivity will be attained more satisfactorily. The first metal magnetic particles may further contain at least one dopant selected from the group consisting of P, Cu, Cr, Ni, Mn, Mo, and Al in order that the corrosion resistance and sphericity of the magnetic particles will be improved.

As stated, the magnetic composite according to an embodiment of the present disclosure can contain first metal magnetic particles that have a relatively large diameter (median diameter (D50)) and second metal magnetic particles that have a diameter (median diameter (D50)) smaller than that of the first metal magnetic particles. The presence of the second, smaller-diameter metal magnetic particles encourages rearrangement of the magnetic particles under low pressure because of a bearing effect. The density and occupancy of the metal magnetic particles as a whole therefore increase, helping improve magnetic permeability.

As mentioned herein, a "bearing effect" represents an effect that allows a surface touching something to be moved easily. In an embodiment of the present disclosure, if first and second metal magnetic particles different in diameter are packed in the magnetic composite, the second metal magnetic particles produce a ball-bearing effect that allows the first metal magnetic particles to be moved easily. As a result, rearrangement of the magnetic particles under low pressure is encouraged, and the density and occupancy of the metal magnetic particles as a whole therefore increase, helping improve magnetic permeability.

Figure 11:
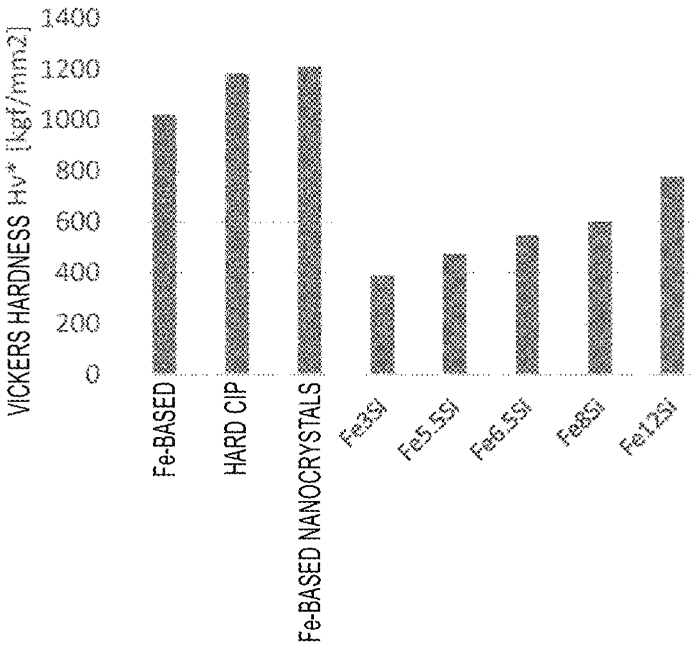
FIG. 11 is a graph of the Vickers hardness of different metal magnetic materials.

Preferably, the Vickers hardness of the second metal magnetic particles is equal to or higher than, more preferably higher than, that of the first metal magnetic particles in order that the second metal magnetic particles will produce their bearing effect well. If being of low hardness, the second metal magnetic particles can be squeezed by the first metal magnetic particles and lose their bearing effect when the metal magnetic particles are sealed with a resin in the production of the magnetic composite. It is therefore preferred to choose second metal magnetic particles made from a magnetic material that produces a good bearing effect on the selected first metal magnetic particles considering the calculated Vickers hardness of metal magnetic materials as illustrated in FIG. 11.

The calculated Vickers hardness represents Vickers hardness calculated from nanoindentation hardness measured using a nanoindenter. The calculation is based on the method set forth in ISO 14577-1. If the first and second metal magnetic particles have substantially the same Vickers hardness, it means the 95% confidence intervals (mean±1.96× standard deviation) of the measured Vickers hardness (sample size n>20) overlap. An example is when the first and second metal magnetic particles are both of an FeSi alloy with dopant(s), such as P, Cu, Cr, Ni, Mn, Mo, and/or Al. In this case, as can be seen from FIG. 11, making the Si content (wt %) of the second metal magnetic particles equal to or higher than that of the first metal magnetic particles will ensure that the second metal magnetic particles have a Vickers hardness equal to or higher than that of the first metal magnetic particles. The aforementioned bearing effect therefore takes place, helping achieve high magnetic permeability of the magnetic composite.

Preferably, the surface of the first and second metal magnetic particles has an insulating coating in order that the electrical insulation of the magnetic composite according to an embodiment of the present disclosure will be improved. This helps prevent direct contact between metal magnetic particles, thereby helping improve the electrical insulation of the magnetic composite. Preferably, such an insulating coating is nonmagnetic. A nonmagnetic insulating coating provides more effective control of flux concentration in the spaces between the first metal magnetic particles and, therefore, more effective prevention of magnetic saturation. The DC bias characteristics can further improve in consequence.

The insulating coating can be made of any insulating material. Examples include silica, phosphate glass, and resin coatings such as a silicone coating, a phenolic resin coating, an epoxy coating, a polyamide coating, and a polyimide coating. If a phosphate glass insulating coating is used, the representative phosphoric acid compound in the phosphate glass can be a phosphate such as calcium phosphate, potassium phosphate, ammonium phosphate, sodium phosphate, magnesium phosphate, aluminum phosphate, a phosphite, or a hypophosphite. Of these, it is particularly preferred to use calcium phosphate.

Preferably, the median diameter (D50) of the second metal magnetic particles is about 0.5 μm or more and about 6 μm or less (i.e., from about 0.5 μm to about 6 μm). By setting the median diameter of the second metal magnetic particles within such a range, good DC bias characteristics can be combined with high magnetic permeability for the following reason. Although the inventors do not wish to be bound by any particular theory, if this median diameter is about 0.5 μm or more, the first metal magnetic particles tend to be separate from one another. By virtue of this, flux concentration is controlled when an external magnetic field is applied, and the flux density through the first magnetic metal particles is reduced in consequence. The overall magnetic saturation in the magnetic composite therefore becomes milder, helping improve DC bias characteristics.

Preferably, this median diameter is about 3.5 μm or more in order that the first metal magnetic particles will be separated better. This leads to better separation between the first metal magnetic particles and therefore better control of flux concentration when an external magnetic field is applied. The flux density through the first metal magnetic particles is therefore reduced better. The overall magnetic saturation in the magnetic composite becomes even milder, helping improving DC bias characteristics more markedly.

If the median diameter of the second metal magnetic particles is about 6 μm or less, the first metal magnetic particles are packed densely, and as a result magnetic permeability is improved, when the magnetic composite is shaped into an article. More preferably, the median diameter (D50) of the second metal magnetic particles is about 2 μm or less, and the D90 of the second metal magnetic particles is about 2.8 μm or less in order that the density of the first metal magnetic particles will be further increased. This further increases the density of the first metal magnetic particles, thereby helping further improve magnetic permeability.

The magnetic permeability of this magnetic composite can be measured using an impedance analyzer, and the DC bias characteristics can be evaluated using an LCR meter. Specifically, the magnetic composite is shaped substantially into a ring first, and a piece of copper wire is wound around the shaped composite. Inductance (L) is measured with direct current (e.g., a direct current of 0 to 30 A) applied to the copper wire. Magnetic permeability (μ) is calculated from L, and the electric current at which μ is down to 70% of that when the applied current is zero ($L_{at}$) is determined. The magnetic field at which μ is 70% ($H_{sat}$) is calculated on the basis of $I_{sat}$, the dimensions of the shaped composite, and the number of turns of the coiled copper wire. This $H_{sat}$, as stated, can provide a measure for evaluating DC bias characteristics. Higher $H_{sat}$ values indicate better DC bias characteristics.

As for the first metal magnetic particles, it is preferred that their median diameter (D50) be about 10 μm or more and about 40 μm or less (i.e. from about 10 μm to about 40 μm). If the median diameter of the first metal magnetic particles is about 10 μm or more, the occupancy of the first and second metal magnetic particles as a whole becomes higher because the second metal magnetic particles penetrate into the space between the first metal magnetic particles. As a result, the magnetic permeability of the magnetic composite is increased. Meanwhile, the clearance between the surface of a body (of an electronic component) and its inner electrodes becomes narrower as the body becomes more compact in size. If the median diameter of the first metal magnetic particles is about 40 μm or less, the first metal magnetic particles tend to be prevented from being placed in such a narrow clearance when a body is made from the magnetic composite.

The percentages by volume of the first and second metal magnetic particles can be adjusted according to the desired magnetic permeability and DC bias characteristics. The percentage by volume of the first metal magnetic particles to the total volume of the first and second metal magnetic particles is not critical, but preferably is about 50% by volume or more and about 90% by volume or less (i.e., from about 50% by volume to about 90% by volume). Larger in diameter than the second metal magnetic particles, the first metal magnetic particles contribute more significantly to the magnetic permeability of the magnetic composite. If their percentage by volume is about 50% by volume or more, it means the first metal magnetic particles are more abundant than the second metal magnetic particles, and this helps increase the magnetic permeability of the magnetic composite as a whole. If the percentage by volume of the first metal magnetic particles is about 90% by volume or less, it is easier to allow sufficient space between the first metal magnetic particles for the second metal magnetic particles to penetrate into. This helps increase the occupancy of the first and second metal magnetic particles as whole, thereby helping increase the magnetic permeability of the magnetic composite.

The percentages by volume of the first and second metal magnetic particles in the magnetic composite according to an embodiment of the present disclosure can be determined by analyzing SEM (scanning electron microscope) images of a cross-section of an article (e.g., substantially a ring) shaped from the magnetic composite, and so can the median diameters D50 of the two sets of magnetic particles.

First, the shaped composite is cut into a separate piece with an exposed cross-section, for example using a wire saw. The cross-section is smoothened, for example using a milling system, and then 300× and 1000× backscattered electron images of the cross-section are taken with an SEM in five fields of view at each magnification. The reason why both 300× (low-magnification) and 1000× (high-magnification) images are taken is that it enables precise analysis of both the diameters of the first metal magnetic particles and those of the second metal magnetic particles.

Then the equivalent circular diameter of the cross-section of the particles is determined on a binarized version of the SEM images using image analysis software. Based on the equivalent circular diameters determined by image analysis, the frequency is plotted to give a histogram. The frequencies vary between the 300× and 1000× images because of the difference in magnification; hence, the frequencies in the 1000× images are multiplied by the square of (1000/300) to make them match the frequencies in the 300× images. Then the diameter at which variations in the histogram made from the 1000× images exceed those in the histogram made from the 300× images is determined. The frequencies at diameters equal to or larger than this threshold are taken from the 300× images, those at diameters smaller than this threshold are taken from the 1000× images, and two sets of frequencies are combined into one histogram.

To convert the frequencies in the histogram into a distribution by volume, the frequencies are multiplied by volumes calculated from diameter intervals and divided by diameters on the basis of quantitative microscopy (reference, Keiryo Keitaigaku (quantitative microscopy, in Japanese), R. T. DeHoff and F. N. Rhines, translated by Kunio Makishima, Yasutada Shinohara, and Takashi Komori, Uchida Rokakuho Publishing, 1972). This calculation is based on the theory in quantitative microscopy that the frequency is higher with decreasing cross-sectional area of particles. The histogram is normalized by dividing the frequency in each interval by the total sum of frequencies to make the total sum of frequencies 1.

The resulting volumetric histogram is fitted by a sum of two lognormal distributions (sum of a lognormal distribution of the first particles and that of the second particles), and the fitted curve is used to calculate the median diameters D50 of the first and second metal magnetic particles and the percentages by volume (proportions) of the first and second metal magnetic particles. The probability density function of a lognormal distribution is given by formula 9.

$$f(x) = \begin{cases} \frac{1}{\sqrt{2\pi}\,\sigma x}\exp\left\{\frac{-(\log x - \mu)^2}{2\sigma^2}\right\}, & x > 0 \\ 0, & x \le 0 \end{cases} \quad \text{[Formula 9]}$$

In this formula, variable x corresponds to a data interval, σ corresponds to variance, and μ corresponds to mean. This probability density function is expressed for the first metal magnetic particles and also for the second metal magnetic particles; therefore, the variables are indeed x1, x2, σ1, σ2, μ1, and μ2. The 1 at the end of variables represents the first metal magnetic particles, and the 2 at the end of variables represents the second metal magnetic particles. Then, to express the probability density function for the first metal magnetic particles and that for the second metal magnetic particles as one probability density function, the probability density functions are multiplied by predetermined proportions (p1 and p2) and then summated. The resulting probability density function, synthesized from the function for the first meal magnetic particles and that for the second metal magnetic particles, is normalized so that the volumetric histogram can be fitted by it.

Of the variables in the probability density function, data intervals x1 and x2 are given as the data intervals in the volumetric histogram. To fit the volumetric histogram by the synthesized probability density function, therefore, variances σ1 and σ2, means μ1 and μ2, and proportions p1 and p2 as variables are optimized by the method of least squares to minimize the difference between the function and histogram. Based on the probability density functions for the first and second metal magnetic particles given by these optimized variables, the data intervals in which the cumulative normalized density function reaches 0.5 are determined as the median diameters D50 of the first and second metal magnetic particles. The optimized proportions p1 and p2, furthermore, are reported as the percentages by volume (proportions) of the first and second metal magnetic particles.

This analytical procedure can also be applied when determining the percentages by volume and median diameters D50 of first and second metal magnetic particles in a chip cross-section of a commercially available inductor or similar product.

The materials for the first and second metal magnetic particles are not critical; any suitable material(s) can be selected according to the desired characteristics and application. In an embodiment of the present disclosure, as stated, the first metal magnetic particles can be of at least one Fe-containing crystalline material. For example, the crystalline material(s) for the first metal magnetic particles can be Fe (e.g., carbonyl iron powder) or at least one alloy selected from the group consisting of FeCo alloys, FeNi alloys, FeSi alloys, and FeSiCr alloys. The second metal magnetic particles can be of at least one crystalline material, amorphous material, or hybrid material (or nanocrystalline material) in which crystalline (or nanocrystalline) and amorphous phases are intermingled together. For example, the material(s) for the second metal magnetic particles can be at least one alloy selected from the group consisting of FeSi alloys, FeNb alloys, FeCu alloys, FeP alloys, and Fe amorphous alloys or Fe (e.g., carbonyl iron powder). An Fe amorphous alloy can be an alloy that is primarily Fe and contains at least one element selected from the group consisting of Si, Cr, B, and C.

The magnetic composite according to an embodiment of the present disclosure can be shaped into an article by curing the resin. The magnetic composite can also be shaped into an article by firing.

The resin can be of any kind; any suitable resin can be selected, for example according to the desired characteristics and application. For example, the resin can be at least one resin selected from the group consisting of epoxy resins, silicone resins, phenolic resins, polyamide resins, polyimide resins, and polyphenylene sulfide resins, although these are not the only possibilities. Thermosetting resins are preferred.

Preferably, the resin content is about 1.5% by weight or more and about 5.0% by weight or less (i.e., from about 1.5% by weight to about 5.0% by weight), more preferably about 2.0% by weight or more and about 5.0% by weight or less (i.e., from about 2.0% by weight to about 5.0% by weight), of the total weight of the magnetic composite. If the resin content is about 1.5% by weight or more, the strength and weatherability of the shaped magnetic composite are improved because there is little space in the shaped composite. This is significant particularly when the shaped article is produced by heating. If the resin content is about 5.0% by weight or less, it is unlikely that resin seeping out of the molds forms burrs.

If containing a resin, the magnetic composite may further contain additives, such as a lubricant, in addition to the first and second metal magnetic particles and resin. Adding a lubricant makes it easier to release the composite from the molds when shaping it, thereby helping improve productivity. Examples of lubricants that can be used include metal soaps, such as zinc stearate, calcium stearate, and lithium stearate, long-chain hydrocarbons, such as waxes, and silicone oils.

Production of the Magnetic Composite

The following describes the production of the magnetic composite according to an embodiment of the present disclosure. The following is merely an example and is not the only method for producing the magnetic composite.

To begin with, first metal magnetic particles that satisfy what is provided by formula (e) 1 and/or 2 are selected. Then first and second metal magnetic particles as described above are prepared. The prepared first and second metal magnetic particles are weighed out and mixed together to predetermined percentages by volume. The resulting mixture of first and second metal magnetic particles is mixed with a predetermined percentage of a resin material to give slurry. What type and how much resin can be used is as described above. An example of a resin material that can be used is a varnish that contains solid epoxy resin and acetone or a glycol solvent.

The resulting slurry is shaped substantially into a sheet. It is not critical how to shape the slurry; any known and suitable process can be used. For example, the slurry can be shaped into a sheet by applying it to a substrate, such as a PET film, to a predetermined thickness by doctor blading. To make the sheet easier to peel off the substrate, the solvent is evaporated by drying the sheet. Any suitable temperature and duration of drying can be selected, for example according to what type and how much solvent is contained. After the drying, the sheet is removed from the substrate.

The sheet removed from the substrate is worked into a predetermined shape. Two or more of such sheets are stacked, and compressing and heating the stack gives a shaped magnetic composite. If the magnetic composite is shaped substantially into a ring, for example, sheets removed from the substrate are stacked in a substantially ring-shaped mold and molded. The molding can be carried out by, for example, compressing the mold under about 80° C. and about 7 MPa conditions for about 10 minutes and then under about 170° C. and about 4.3 MPa conditions for about 30 minutes. This gives an article shaped from the magnetic composite according to an embodiment of the present disclosure.

Although in the above method a shaped article is produced by curing a resin by heating, firing can also be used.

If a shaped article is produced by firing, the metal magnetic particles are mixed with a binder, such as PVA (polyvinyl alcohol), to give a paste of metal magnetic material. Shaping this paste of metal magnetic material, for example by doctor blading, and firing the resulting shaped article at a predetermined temperature gives a shaped magnetic composite. The firing is carried out at a temperature at which the metal magnetic particles can sinter.

Inductor

The following describes an inductor made with the magnetic composite according to an embodiment of the present disclosure. The following describes a possible construction of the inductor by way of example, but this is not the only possible construction.

Figure 12:
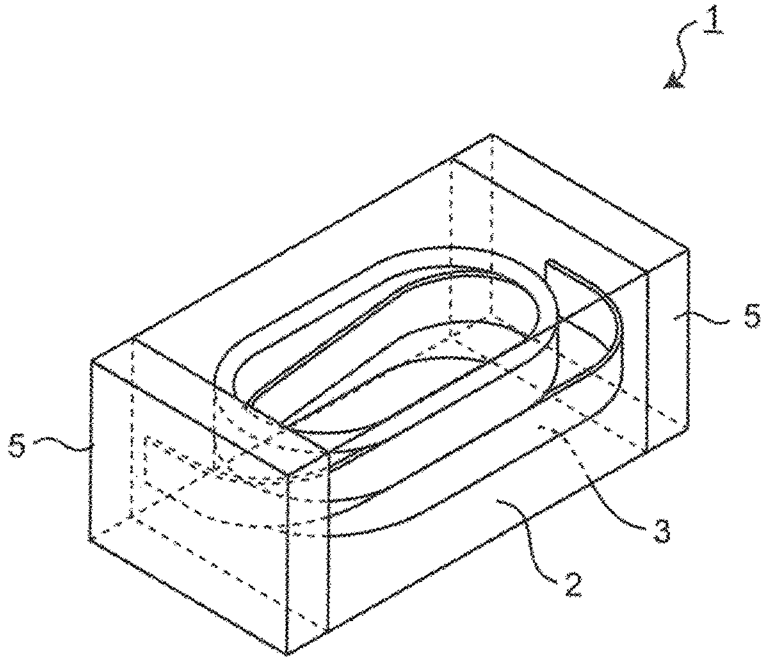
FIG. 12 is a schematic perspective view of an inductor made with a magnetic composite according to an embodiment of the present disclosure.

FIG. 12 illustrates an example of a construction of an inductor made with the magnetic composite according to an embodiment of the present disclosure. In the construction illustrated in FIG. 12, the inductor 1 includes a body 2 made of the magnetic composite, outer electrodes 5 on the surface of the body 2, and an electrically conductive coil 3 inside the body 2.

The inductor 1 illustrated in FIG. 12 can be produced as follows, for example. First, an electrical conductor is wound into a coil 3. Any winding technology can be used, such as α winding (both ends of the wire facing out of the coil), wild winding, edgewise winding, or aligned winding.

Then the conductive coil 3 is heated with an applied thermosetting composition thereon. This produces a coated conductive coil 3, having a coating on its surface. The application of a thermosetting composition may be carried out by, for example, dipping or spraying or may be by a combination thereof. In dipping or spraying, it is easy to adjust the loading of the thermosetting composition to the desired amount. For spraying, the composition may be sprayed all at once or may be sprayed in divided portions. Heating the conductive coil 3 with an applied thermosetting composition thereon causes at least part of a thermosetting compound contained in the thermosetting composition to form a coating, for example through crosslinking. The coating produced by heating may be partially uncured or may be completely cured. The completeness of the curing of the coating can be estimated by thermal analysis, such as differential thermal analysis or thermogravimetry.

The formation of a coating through the application and heating of a thermosetting composition may be repeated as necessary. Forming a coating as many times as desired can further improve dielectric withstand characteristics because this allows the coating to grow to its desired thickness with better uniformity.

After the application but before the heating of the thermosetting composition, the workpiece may be dried to remove at least part of a liquid medium contained in the thermosetting composition. The drying may be independent of the heating or may be continuous with the heating. The drying, moreover, may be carried out under atmospheric or reduced pressure, with or without heat. Any suitable drying conditions, such as temperature and duration, can be selected, for example according to the chemical makeup and loading of the thermosetting composition.

The loading of the thermosetting composition may be adjusted to give a cured coating having the desired thickness. Any suitable heating conditions, such as temperature and duration, can be selected, according to the chemical makeup and loading of the thermosetting composition. For example, if the electrical conductor forming the conductive coil 3 is covered with a thermosetting composition, the heating temperature can be about 80° C. or more and about 250° C. or less (i.e., from about 80° C. to about 250° C.).

Before the application of the thermosetting composition to the conductive coil 3, the surface of the conductive coil 3 may be cleaned with an organic solvent, such as an alcohol or acetone, and may be treated with a surface treatment agent, such as a coupling agent or an adhesion improver, with ultraviolet radiation or with radicals, such as oxygen plasma. This further improves the adhesion of the coating to the conductive coil 3, helping achieve better characteristics.

Then the resulting coated coil is embedded in a body 2 made of the magnetic composite, and the workpiece is compressed to give a body 2 with the conductive coil 3 inside. The conditions for the embedding of the coated coil in the body 2 and for subsequent compression can be those common in the related art.

The outer electrodes 5 can be formed on, for example, the body 2 in which the coated coil has been embedded. In this case, the outer electrodes 5 can be made by applying a paste of electrical conductor paste for the outer electrodes 5 to both ends of the body 2 with the coated coil therein and then heating the applied coating. The outer electrodes 5 can also be formed by plating. Alternatively, the outer electrodes 5 can be made by applying a paste of electrical conductor for the outer electrodes 5 to both ends of the body 2 with the coated coil therein, baking the applied coating, and then plating the baked coating. In this case, the body 2 may be impregnated with a resin beforehand to prevent the plating solution from penetrating into any space present in the body 2. In this way, an inductor 1 made with the magnetic composite according to an embodiment of the present disclosure is obtained.

EXAMPLES

The following describes an example of an embodiment of the present disclosure.

The first metal magnetic particles were of one of commercially available Fe-containing crystalline materials produced by atomization. The second metal particles were carbonyl iron powder (average diameter, 4 μm). Each type of first metal magnetic particles were classified through 20-μm and 53-μm mesh sieves to have similar average sizes (average diameter, 40 μm). The degree of magnetization was measured using a VSM (vibrating sample magnetometer; Toei Industry VSM-P7), and saturation flux density was determined based on a true density measured by volumetric multipoint BET (MicrotracBEL BELSORP). The coercivity of the powders was also measured, using an Hc meter (Tohtoku Kogyo K.K. K-HC1000).

As stated, Table 1 is a list of saturation flux density versus coercivity for the types of first metal magnetic particles used. As shown in Table 1 and FIG. 2, it was found that if material samples 1 to 6 are used as Fe-containing crystalline materials, coercivity (Hc [A/m]) tends to be substantially stable even with increasing saturation flux density (Bs [T]) up to near a predetermined saturation flux density (1.69 T), but beyond the predetermined saturation flux density, coercivity (Hc [A/m]) tends to increase rapidly.

Figure 13:
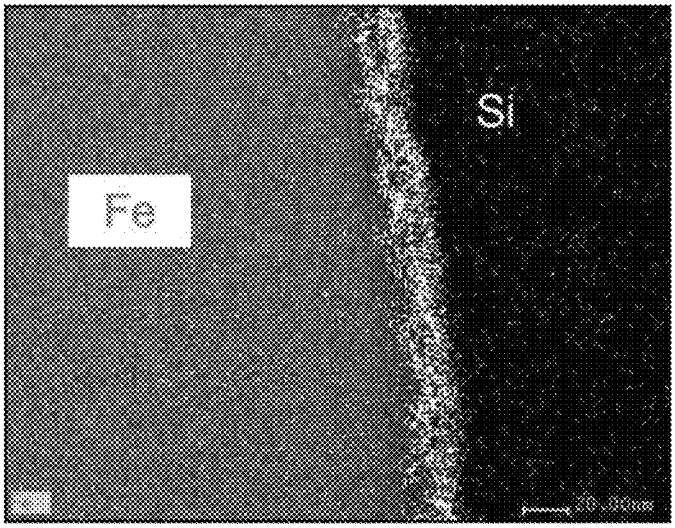
FIG. 13 is a STEM/EDX image of a silica-coated metal (Fe) magnetic particle.

Then the surface of the metal magnetic particles was coated with silica by the sol-gel process. The thickness of the coating was checked by sealing the coated powder with a resin, subjecting the sealed powder to FIB processing, and analyzing the exposed cross-section by STEM/EDX (Hitachi High-Technologies HD-2300A/EDAX GENESIS XM 4). At a magnification of 400 k, an EDX image of the Fe (iron) and Si (silicon) elements was obtained. An EDX image obtained is presented in FIG. 13. The thickness of the coating of the Si element was measured at four points equally spaced by a distance of 30 nm selected on the surface of the Fe particle. The measured thickness of the coating was about 90 nm on the first metal magnetic particles and about 10 nm on the second metal magnetic particles.

Then the first and second metal magnetic particles were mixed with a resin to give a composite material, this composite material was shaped into rings, and these ring-shaped test articles were subjected to the measurement of relative magnetic permeability and DC bias characteristics. First, the first and second metal magnetic particles were mixed together to a ratio by volume of 75:25. The volume of each set of particles was calculated from the true density and weight of the particles. The resulting mixture was slurried with an epoxy resin and a glycol solvent (methyl ethyl ketone). The amount of resin was selected so that the weight of solid resin would be 2 wt % of the combined weight of the metal magnetic particles and solid resin. The slurry was cured to some extent in a drying oven, the partially cured material was milled, and the resulting powder was screened to give granules. These granules were shaped by heat pressing into rings having an outer diameter of 13 mm and an inner diameter of 8 mm.

This heat pressing was carried out with varying shaping pressure to give multiple rings with different packing density. After shape measurement (outer diameter, inner diameter, and thickness), each ring-shaped test article was subjected to the measurement of relative magnetic permeability with an impedance analyzer (Keysight E4991A). As for DC bias characteristics, a piece of copper wire (diameter, 0.35 mm; 24 turns) was wound around each ring, and this test article was tested on an LCR meter (Keysight 4284A). Here, the amount of electric current at which the relative magnetic permeability is down to 70% of the initial relative magnetic permeability (before the application of a DC bias current) is defined as Isat. The average magnetic field Hsat in a ring was defined by the formula below, and this Hsat was used as a measure of DC bias characteristics. Then a secondary coil was wound around each ring-shaped test article, and the resulting structure was subjected to the measurement of BH curves with a BH analyzer (Iwatsu Electric Co., Ltd. SY8218). The DC bias characteristics and BH curves were measured at a frequency of 1 MHz.

$$\mathrm{Hsat}=2\times N\times \mathrm{Isat}/\{\pi\times(R+r)\} \quad \text{[Formula]}$$

Figure 14:
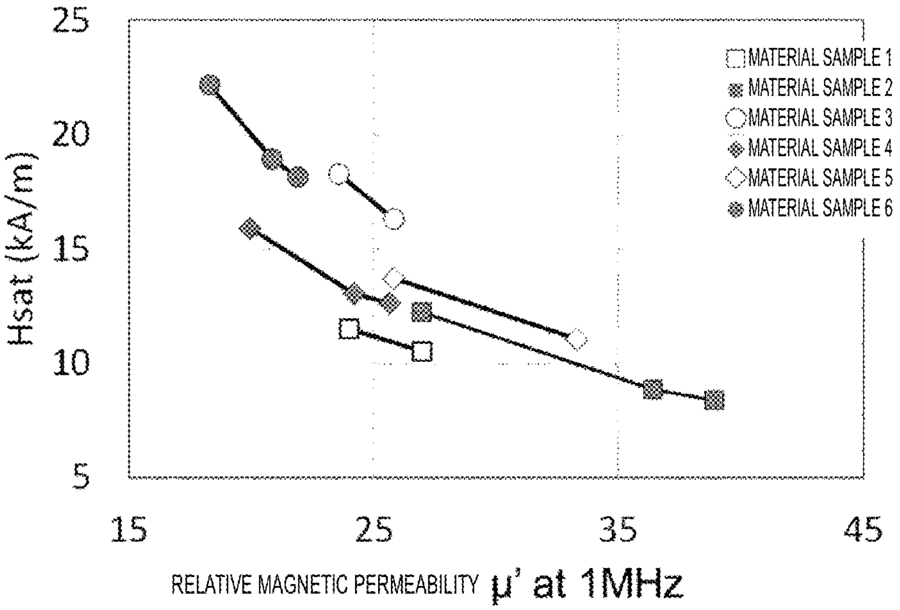
FIG. 14 is a graph of initial relative magnetic permeability versus Hsat.

R, outer diameter [m] of the ring; r, inner diameter [m] of the ring; N, the number of turns in the coil; Isat and Hsat are in A and kA/m, respectively The measured relationship between initial magnetic permeability and Hsat, which correlates with DC bias characteristics, is presented in FIG. 14. In FIG. 14, the multiple data points for each material sample correspond to test articles produced with varying shaping pressure. In general, there is a trade-off between relative magnetic permeability and Hsat, which correlates with DC bias characteristics. In FIG. 14, too, Hsat tends to decrease with increasing relative magnetic permeability. When types of first metal magnetic particles were compared at the same relative magnetic permeability, however, Hsat, which correlates with DC bias characteristics, was not the same. To determine which type is better, Hsat at an initial relative magnetic permeability of 25 was estimated and plotted against saturation flux density (see FIG. 1). Table 1 presents the estimated values of Hsat at an initial relative magnetic permeability of 25. As can be seen from FIG. 1, Hsat increased with increasing saturation flux density up to approximately 1.7 T but did not clearly improve beyond this.

Specifically, the following was found. As shown in Table 1 and FIG. 1, if material samples 1 to 6 are used as Fe-containing crystalline materials, rated DC magnetic field (Hsat [kA/m]) tends to increase with increasing saturation flux density (Bs [T]) up to near a particular saturation flux density (1.69 T), but beyond the particular saturation flux density, rated DC magnetic field (Hsat [kA/m]) tends to decrease. After considering these together, the inventors discovered that an increase in coercivity has been an obstacle to improving DC bias characteristics.

Figure 15:
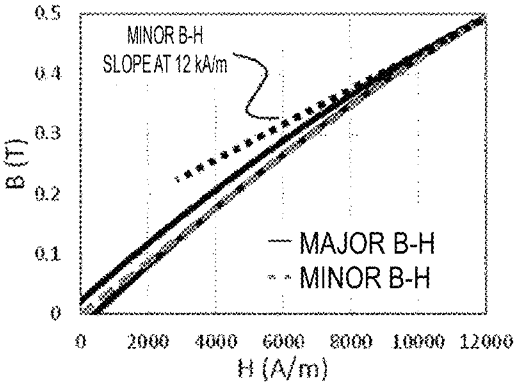
FIG. 15 presents graphs for the magnetization curve of material samples 3 and 5.
Figure 15:
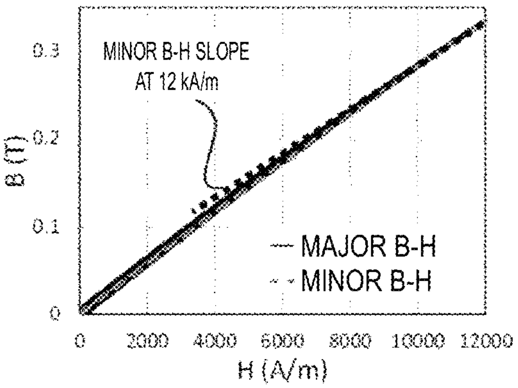

To understand the mechanism behind this, the inventors studied magnetization curves using a B-H analyzer. FIG. 15 presents magnetization curves from material samples 3 and 5. Both include the major B-H curve and a minor B-H curve at an amplitude of 12 kA/m. Given that a DC bias magnetic field of 12 kA/m was applied, the magnetic permeability to AC magnetic fields corresponds to the slope of the minor B-H curve in FIG. 15. For material sample 3, the slope of the minor B-H curve is close to that of the major B-H curve. For material sample 5, however, the slope of the minor B-H curve is far different from that of the major B-H curve, indicating that sample material 5 is highly hysteretic and therefore lost much of its magnetic permeability even before it became saturated. That is, it was found that when the magnetic composite as a whole has yet to be saturated, not only saturation flux density but also the hysteresis of the magnetic composite has great impact on DC bias characteristics. It therefore became clear that DC bias characteristics can be improved effectively by reducing coercivity.

Figure 3:
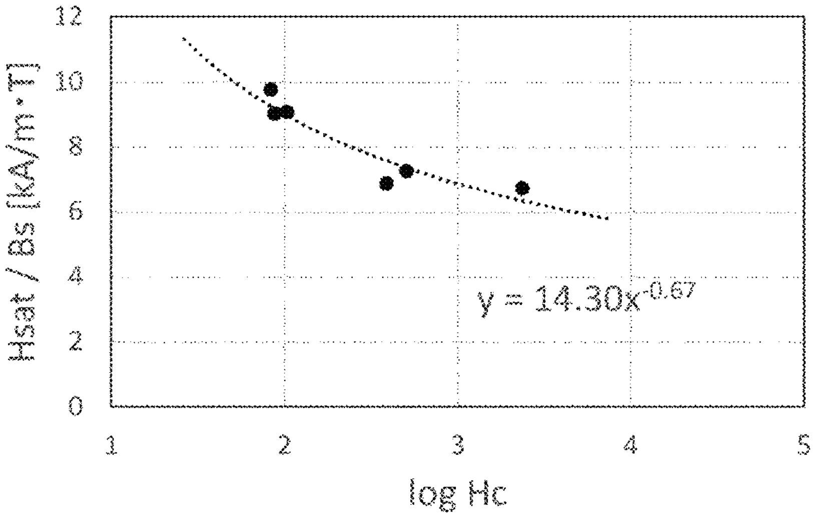
FIG. 3 is a graph of log Hc versus Hsat/Bs.

Based on these findings, the inventors investigated the impact of saturation flux density and coercivity on DC bias characteristics. If coercivity is constant, DC bias characteristics are expected to improve with higher saturation flux density. Thus the inventors studied the relationship between Hsat [kA/m] normalized by saturation flux density (Bs [T]) and coercivity (Hc [A/m]). The study revealed there is a relationship as shown in FIG. 3.

$$\mathrm{Hsat}/Bs=\alpha\times\{\log(Hc)\}^{\wedge}\beta \quad \text{[Formula 3]}$$

$$\alpha=14.3$$

$$\beta=-0.67$$

When looking at factors that can influence coercivity, the coercivity of a typical magnetic material becomes greater with smaller diameter of crystallites and with higher saturation flux density. The former, the inventors believe, depends on the density of grain boundaries (i.e., diameter of crystallites), which can provide pinning sites for domain wall displacement, and the latter depends on the strength of coupling between magnetic moments (exchange coupling energy). Assuming these and presuming that coercivity is determined by quantities D and Bs depending on these two terms (D, diameter of crystallites; Bs, saturation flux density), the inventors attempted to understand each quantity experimentally.

First, as a study on the diameter of crystallites, the relationship between coercivity and diameter of crystallites was investigated for commercially available Fe6.5Si (93.5 wt % Fe and 6.5 wt % Si) alloys produced by atomization processes varying in cooling rate and heating conditions. To ensure that each alloy would be identical in terms of particle size distribution, powder that passed through a 53-μm mesh screen and did not pass through a 20-μm mesh screen was used. After the classification, the median diameter (D50) and saturation flux density Bs of each of these types of particles were 43 μm and 1.75 T, respectively. These material samples were sealed with an epoxy resin, polished to expose a cross-section, had the exposed cross-section ground by ion milling, and then were subjected to the observation of the ground surface by FE-SEM (JEOL Ltd. JSM-7900F) in backscattered electron mode. The acceleration voltage and electric current for the observation ranged from 5 to 11 keV and 8 to 11 A, respectively.

Then the diameter of crystallites in these material samples was calculated by image analysis. The image analysis was carried out using WinROOF® (Mitani Corporation), and the median in the distribution of equivalent circular diameters of crystallites contained in thirty randomly selected particles was reported as the diameter of crystallites. FIG. 5 presents the relationship between median diameter of crystallites and coercivity. It was found that as the diameter of crystallites increases, coercivity decreases. As shown in FIG. 6, furthermore, the coercivity of a crystalline metal material is in a linear relationship with inverse median diameter D of crystallites. This relationship was formulated as follows.

$$Hc=\gamma\times 1/D+Hc0(\gamma=752, Hc0=50.7) \quad \text{[Formula 4]}$$

In this formula, the intercept (Hc0 [A/m]) represents the coercivity when the diameter of crystallites is infinity, or when there is no influence of grain boundaries. The formula suggests that coercivity depends on composition, or on saturation flux density.

Figure 8:
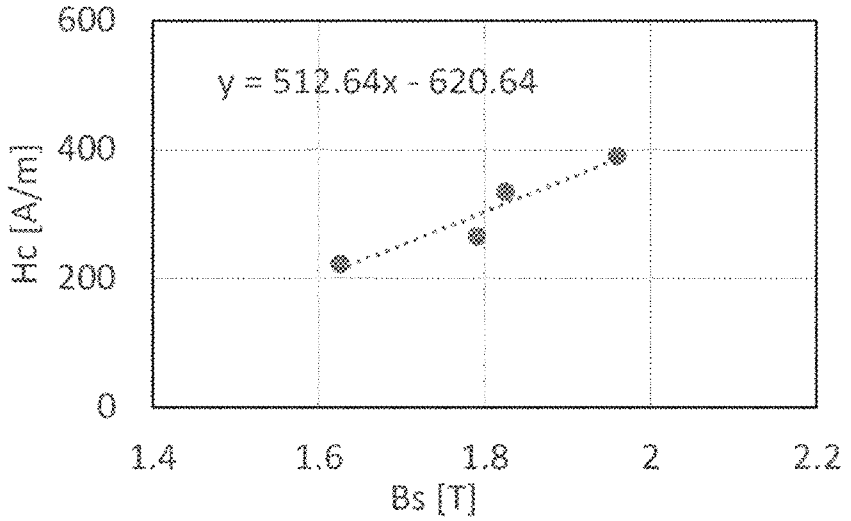
FIG. 8 is a graph of saturation flux density (Bs [T]) versus coercivity (Hc [A/m])

Then, as a study on the relationship between Bs and Hc, the FeSi alloys with different Si percentages were atomized, and the Bs and Hc of the resulting powders were measured. The tested sets of particles had similar diameters of crystallites. FIG. 7 presents the relationship between Si content and Bs and Hc. FIG. 8 is a plot of Bs versus Hc based on the data presented in FIG. 7, demonstrating a correlation between Bs and Hc. As is clear from these, Hc increases with Bs. In FIG. 8, coefficient δ in the following formula was calculated from the slope of the regression line.

$$Hc0=\delta\times Bs+\varepsilon \quad \text{[Formula 5]}$$

$$(\delta=512)$$

In this formula, the inventors believe, the intercept (ε) is attributed to impurities, structural defects, etc., present in boundaries between or inside crystal grains. Hc0 was calculated according to the Hc=γ×1/D+Hc0 presented in FIG. 6 (γ=752, Hc0=50.7). Substituting δ=512, Bs=1.69 T, and Hc0=50.7 in formula 5, therefore, gives ε.

Coercivity was therefore formulated as follows.

$$Hc=\gamma\times 1/D+\delta\times Bs+\varepsilon \quad \text{[Formula 6]}$$

$$(\gamma=598, \delta=512, \varepsilon=-815)$$

It was therefore found that the following relationship holds between Bs, Hc, and Hs at.

$$\text{Hsat}=Bs\times\alpha\times\{\log(\gamma\times 1/D+\delta\times Bs+\varepsilon)\}^{\beta} \quad \text{[Formula 7]}$$

$$(\alpha=14.3, \beta=-0.67, \gamma=752, \delta=512, \surd=-815)$$

FIG. 9 presents the relationship between rated DC magnetic field (Hsat [kA/m]) and median diameter of crystallites (D [μm]) at different saturation flux densities (Bs=1.4 to 2.0 [T]). From this drawing, it can be seen that the improvement of rated DC magnetic field (Hsat [kA/m]) relies on how large Bs and of the diameter of crystallites are. In this example of the present disclosure, a particular focus was on what range these parameters should be in to achieve a rated DC magnetic field (Hsat [kA/m]) requirement for small inductors for RF applications, i.e., about 13 kA/m or more or preferably about 14 kA/m or more.

Based on these, the relationship between the median diameter of crystallites (D, μm) and saturation flux density (Bs, T) of an Fe-containing crystalline material was formulated as follows.

$$Bs\times\alpha\times\{\log(\gamma\times 1/D+\delta\times\delta\times Bs+\varepsilon)\}^\wedge\beta\geq 13 \quad \text{[Formula 1]}$$

$$(\alpha=14.3, \beta=-0.67, \gamma=752, \delta=512, \varepsilon=-815)$$

Figure 10:
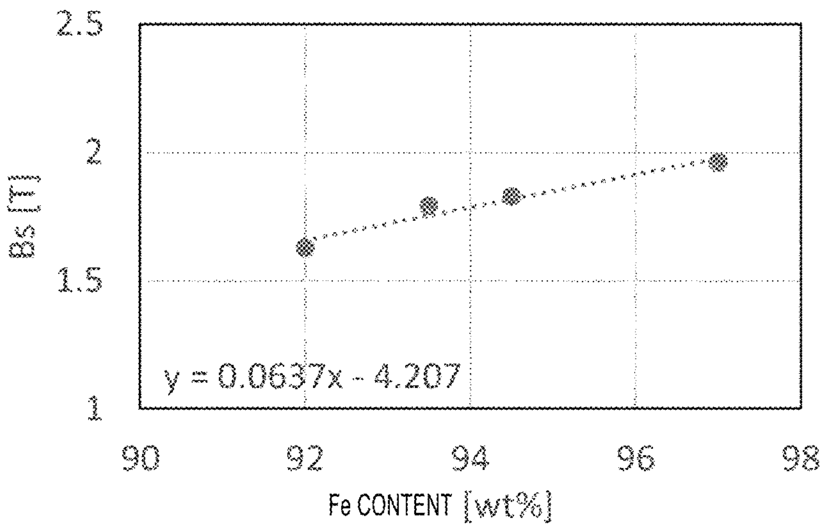
FIG. 10 is a graph of Fe content (wt %) versus saturation flux density (Bs [T])

The Bs of an Fe-based alloy is governed strongly by composition, the Fe content in particular. Considering this, the relationship between the Fe content (wt %) of magnetic particles and saturation flux density was explored. As shown in FIG. 10, it was found that there is a correlation between the two parameters. This relationship was formulated as follows.

$$Bs=0.0637\times\text{Fe content (wt \%)}-4.21 \quad \text{[Formula 8]}$$

Based on these, the relationship between the median diameter of crystallites (D, μm) and the Fe content (wt %) of an Fe-containing crystalline material was formulated as follows.

$$(A\times\text{Fe content (wt \%)}+B)\times\alpha\times[\log\{\gamma\times 1/D+\delta\times(A\times\text{Fe content (wt \%)}+B)+\varepsilon\}]^\wedge\beta\geq 13 \quad \text{[Formula 2]}$$

$$(\alpha=14.3, \beta=-0.67, \gamma=752, \delta=512, \varepsilon=815, A=0.0637, B=-4.21)$$

Overall, the inventors concluded that formulae 1 and 2 tell us the median diameter of crystallites (D, μm) and saturation flux density (Bs)/Fe content (wt %) of an Fe-containing crystalline material with which the desired rated DC magnetic field (Hsat [kA/m]) can be achieved.

The percentages by volume of first and second metal magnetic particles in a ring-shaped magnetic material as in this example can be determined by analyzing SEM images of a cross-section of the ring, and so can the median diameters D50 of the first and second metal magnetic particles. The following describes the details of the analytical procedure for an exemplary case in which the first and second metal magnetic particles are mixed together to a ratio by volume of 82:18, and the resulting mixture is shaped into a ring.

The percentages by volume and diameters (D50) of the first and second metal magnetic particles can be known by imaging a cross-section of a ring by SEM at magnifications of 300× and 1000×, binarizing the images, and expressing the particle size distribution in a histogram.

The equivalent circular diameters of particles obtained by image analysis were converted into a volumetric histogram, and this histogram was fitted by a sum of lognormal distributions of the first and second metal magnetic particles. This gave the diameter D50 and percentage of the first metal magnetic particles and those of the second metal magnetic particles.

Figure 16:
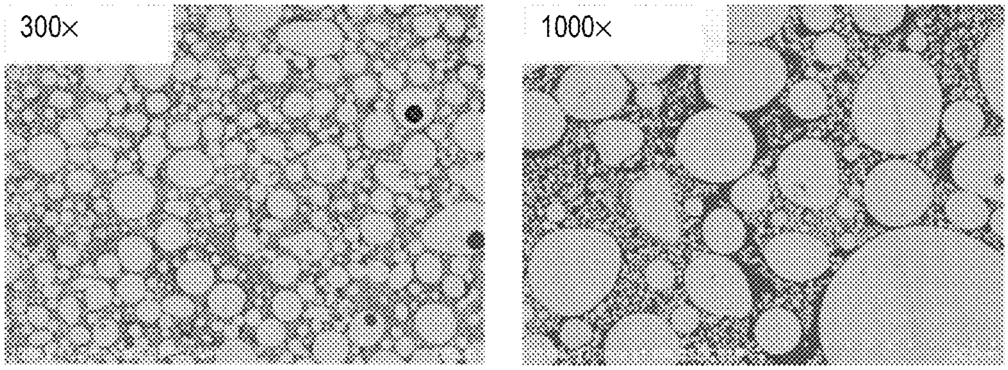
FIG. 16 presents 300× and 1000× backscattered electron images of a cross-section of a shaped magnetic composite.

Specifically, the ring was cut into a separate piece with an exposed cross-section using a wire saw. The cross-section was smoothened using a milling system (Hitachi High-Technologies IM4000), and then 300× and 1000× backscattered electron images of the cross-section were taken with an SEM (Hitachi High-Technologies SU1510) in five fields of view at each magnification. A pair of 300× and 1000× backscattered electron images are presented in FIG. 16.

Figure 17:
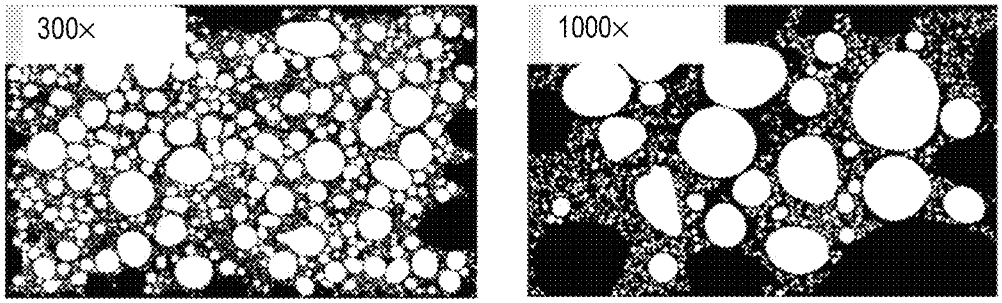
FIG. 17 presents a binarized version of the backscattered electron images in FIG. 16.

The image analysis was carried out using A-ZO KUN® (Asahi Kasei Engineering Corporation). On binarized images, the equivalent circular diameter of the cross-section of the particles was determined. FIG. 17 presents a binarized version of the backscattered electron images in FIG. 16, excluding the area of the scale bar. The particle size distribution was expressed in a histogram based on data intervals defined as in Table 3.

TABLE 3

| Data interval [μm] |
|---|
| 0.1 |
| 0.3 |
| 0.4 |
| 0.6 |
| 0.8 |
| 0.9 |
| 1.1 |
| 1.3 |
| 1.4 |
| 1.6 |
| 1.8 |
| 1.9 |
| 2.1 |
| 2.3 |
| 2.5 |
| 2.8 |
| 3.0 |
| 3.3 |
| 3.6 |
| 3.9 |
| 4.2 |
| 4.6 |
| 5.0 |
| 5.5 |
| 6.0 |
| 6.5 |
| 7.1 |
| 7.8 |
| 8.5 |
| 9.3 |
| 10.1 |
| 11.0 |
| 12.0 |
| 13.1 |
| 14.3 |
| 15.6 |
| 17.0 |
| 18.5 |
| 20.2 |
| 22.0 |
| 24.0 |
| 26.2 |
| 28.5 |
| 31.1 |
| 33.9 |
| 37.0 |
| 40.4 |
| 44.0 |
| 48.0 |
| 52.3 |
| 57.1 |
| 61.5 |
| 66.1 |

Based on the equivalent circular diameters determined by image analysis, the frequency was plotted over the range defined by the intervals in Table 3 to give a histogram. The number of particles counted was 21263 in the 300× images and 13600 in the 1000× images. The frequencies varied between the 300× and 1000× images because of the difference in magnification; hence, the frequencies in the 1000× images were multiplied by the square of (1000/300) to make them match the frequencies in the 300× images. In the histograms, the frequencies at diameters equal to or larger than 20.2 μm were taken from the 300× images, those at diameters smaller than 20.2 μm were taken from the 1000× images, and two sets of frequencies were combined into one histogram. The reason why a diameter of 20.2 μm was the threshold is that this is the diameter at which variations in the histogram made from the 1000× images exceeded those in the histogram made from the 300× images.

To convert the frequencies in the histogram into a distribution by volume, the frequencies were multiplied by volumes calculated from diameter intervals and divided by diameters on the basis of quantitative microscopy. The histogram was normalized by dividing the frequency in each interval by the total sum of frequencies to make the total sum of frequencies 1. The resulting volumetric histogram was fitted by a sum of two lognormal distributions, and the fitted curve was used to calculate the D50 and proportion of the first metal magnetic particles and those of the second metal magnetic particles. As stated, the probability density function of a lognormal distribution is given by formula 9.

[Formula 9]

$$f(x) = \begin{cases} \dfrac{1}{\sqrt{2\pi}\,\sigma x}\exp\left\{\dfrac{-(\log x - \mu)^2}{2\sigma^2}\right\}, & x > 0 \\ 0, & x \le 0 \end{cases}$$

In formula 9, variable x corresponds to a data interval, σ corresponds to variance, and μ corresponds to mean. This probability density function is expressed for the first metal magnetic particles and also for the second metal magnetic particles; therefore, the variables are indeed x1, x2, σ1, σ2, μ1, and μ2. The suffix 1 meant that the variable pertains to the first metal magnetic particles, and the suffix 2 meant that the variable pertains to the second metal magnetic particles. Then, to express, the probability density function for the first metal magnetic particles and that for the second metal magnetic particles as one probability density function, the probability density functions were multiplied by predetermined proportions (p1 and p2) and then summated. The resulting probability density function, synthesized from the function for the first meal magnetic particles and that for the second metal magnetic particles, was normalized so that the volumetric histogram could be fitted by it.

Figure 18:
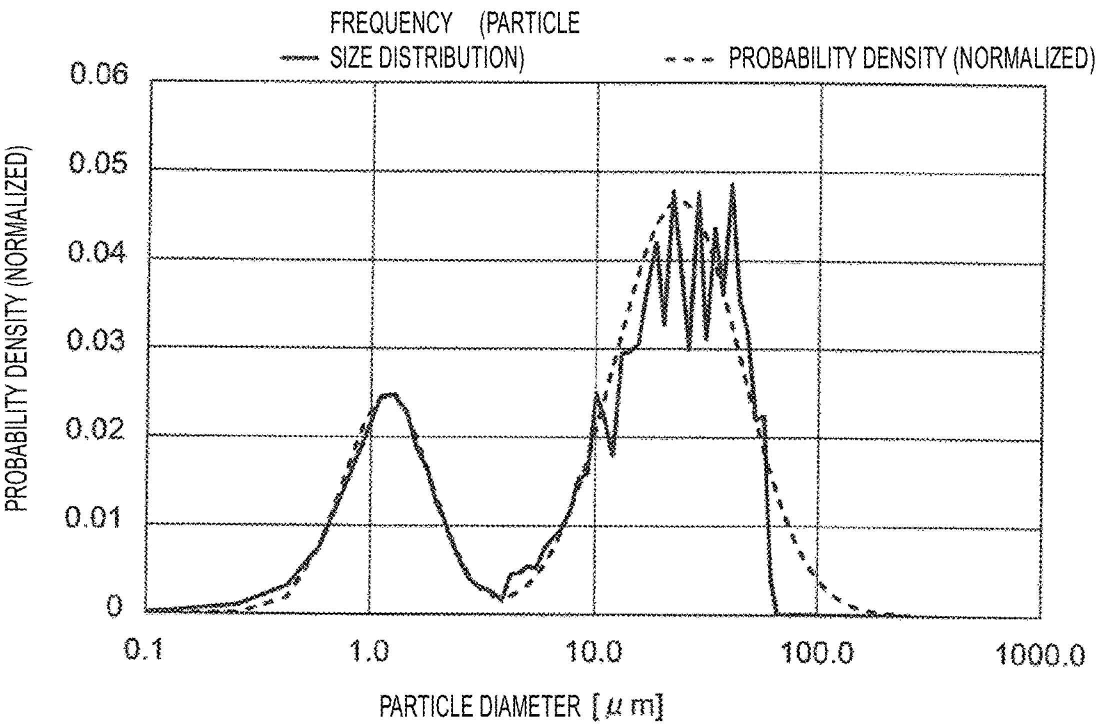
FIG. 18 presents a particle size distribution obtained by image analysis and a fitted lognormal distribution curve.

Of the variables in the probability density function, data intervals x1 and x2 are given as the data intervals in the volumetric histogram. To fit the volumetric histogram by the synthesized probability density function, therefore, variances σ1 and σ2, means μ1 and μ2, and proportions p1 and p2 as variables were optimized by the method of least squares to minimize the difference between the function and histogram. A fitted curve is presented in FIG. 18. Based on the probability density function for the first metal magnetic particles and that for the second metal magnetic particles given by these optimized variables, the data intervals in which the cumulative normalized density function reached 0.5 were determined as the D50 of the first and second metal magnetic particles. The optimized proportions p1 and p2, furthermore, were reported as the percentage by volume of the first metal magnetic particles and that of the second metal magnetic particles.

The foregoing description of an embodiment of the present disclosure is merely a typical example of what is included in the scope of the present disclosure. It would be apparent to those skilled in the art that the present disclosure is not limited to the foregoing description and can be implemented with various modifications.

INDUSTRIAL APPLICABILITY

The magnetic composite according to an embodiment of the present disclosure can be used to produce an inductor.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A magnetic composite comprising first metal magnetic particles and a resin, wherein:

the first metal magnetic particles contain at least one Fe-containing crystalline material; and $$Bs\times\alpha\times\{\log(\gamma\times 1/D+\delta\times Bs+\varepsilon)\}^\beta\geq 13T, \quad \text{[Formula 1]}$$

where Bs and D are a saturation flux density in T and a median diameter of crystallites in μm, respectively, of the crystalline material, $\alpha=14.3, \beta=-0.67$, $\gamma=752$, $\delta=512$, and $\varepsilon=-815$, and the Fe constitutes from 91 wt % to 98 wt % of the first metal magnetic particles, and a Si constitutes from 2 wt % to 9 wt % of the first metal magnetic particles.

2. The magnetic composite according to claim 1, wherein the first metal magnetic particles have a median diameter D50 of 10 μm or more and 40 μm or less.

3. The magnetic composite according to claim 1, wherein the median diameter of the crystallites of the crystalline material in the first metal magnetic particles is 5 μm or more.

4. The magnetic composite according to claim 1, further comprising second metal magnetic particles that have a smaller median diameter D50 than the first metal magnetic particles.

5. The magnetic composite according to claim 4, wherein the second metal magnetic particles are of at least one alloy selected from the group consisting of alloys containing Fe and Si, alloys containing Fe and Nb, alloys containing Fe and Cu, alloys containing Fe and P, and Fe-containing amorphous alloys or of Fe.

6. The magnetic composite according to claim 4, wherein the second metal magnetic particles have a Vickers hardness equal to or higher than a Vickers hardness of the first metal magnetic particles.

7. The magnetic composite according to claim 4, wherein the first metal magnetic particles constitute from 50% by volume to 90% by volume of a total volume of the first and second metal magnetic particles.

8. The magnetic composite according to claim 4, wherein the second metal magnetic particles have a median diameter D50 of from 0.5 μm to 6 μm.

9. The magnetic composite according to claim 8, wherein the median diameter D50 of the second metal magnetic particles is 2 μm or less, and the second metal magnetic particles have a D90 of 2.8 μm or less.

10. The magnetic composite according to claim 8, wherein the median diameter D50 of the second metal magnetic particles is from 3.5 μm to 6 μm.

11. The magnetic composite according to claim 4, wherein the second metal magnetic particles contain an Fe-containing crystalline material, and the crystalline material has a median diameter of crystallites equal to or larger than 0.5 times the median diameter D50 of the second magnetic particles.

12. The magnetic composite according to claim 4, wherein a ratio of the median diameter of the crystallites of the crystalline material in the first metal magnetic particles to a median diameter of crystallites of a crystalline material in the second metal magnetic particles is from 1.1 to 5.0.

13. An inductor comprising the magnetic composite according to claim 1.

14. A magnetic composite comprising metal magnetic particles and a resin, wherein:

the first metal magnetic particles contain at least one Fe-containing crystalline material; and $$(A\times\text{Fe content in wt \%}+B)\times\alpha\times[\log\{\gamma\times 1/D+\delta\times(A\times\text{Fe content in wt \%}+B)+\varepsilon\}]^\beta\geq 13,(\text{in wt \%}) \quad \text{[Formula 2]},$$

where D is a median diameter of crystallites in μm of the crystalline material, $\alpha=14.3$, $\beta=-0.67$, $\gamma=752$, $\delta=512$, $\varepsilon=-815$, $A=0.0637$, and $B=-4.21$, and the Fe constitutes from 91 wt % to 98 wt % of the first metal magnetic particles, and a Si constitutes from 2 wt % to 9 wt % of the first metal magnetic particles.

15. The magnetic composite according to claim 14, wherein the first metal magnetic particles have a median diameter D50 of 10 μm or more and 40 μm or less.

16. The magnetic composite according to claim 14, wherein the median diameter of the crystallites of the crystalline material in the first metal magnetic particles is 5 μm or more.

* * * * *